(12) United States Patent
Kim

(10) Patent No.: US 12,397,641 B2
(45) Date of Patent: Aug. 26, 2025

(54) INFORMATION DEVICE FOR VEHICLE

(71) Applicant: Hak Soo Kim, San Diego, CA (US)

(72) Inventor: Hak Soo Kim, San Diego, CA (US)

(73) Assignee: Hak Soo Kim, San Diego, CA (US)

( * ) Notice: Subject to any disclaimer, the term of this patent is extended or adjusted under 35 U.S.C. 154(b) by 200 days.

(21) Appl. No.: 18/108,408

(22) Filed: Feb. 10, 2023

(65) Prior Publication Data

US 2023/0278424 A1   Sep. 7, 2023

(30) Foreign Application Priority Data

Feb. 11, 2022  (KR) .................. 10-2022-0017893
Aug. 3, 2022   (KR) .................. 10-2022-0096661

(51) Int. Cl.
*B60K 35/00*   (2024.01)
*B60K 35/22*   (2024.01)
*B60K 35/28*   (2024.01)
*B60K 35/81*   (2024.01)

(52) U.S. Cl.
CPC .............. *B60K 35/00* (2013.01); *B60K 35/22* (2024.01); *B60K 35/28* (2024.01); *B60K 35/81* (2024.01); *B60K 2360/176* (2024.01); *B60K 2360/178* (2024.01); *B60K 2360/179* (2024.01)

(58) Field of Classification Search
None
See application file for complete search history.

(56) References Cited

U.S. PATENT DOCUMENTS

| | | | | |
|---|---|---|---|---|
| 8,031,085 B1* | 10/2011 | Anderson | .............. | B60Q 5/008 340/901 |
| 8,954,252 B1* | 2/2015 | Urmson | .................. | G08G 1/167 701/301 |
| 9,551,992 B1* | 1/2017 | Barton-Sweeney | | ......................... G06Q 10/047 |
| 10,082,562 B1* | 9/2018 | Abari | ...................... | G01S 13/48 |
| 10,272,827 B1* | 4/2019 | Kemler | ........... | B60W 60/00253 |
| 10,306,430 B1* | 5/2019 | Abari | .................... | G05D 1/0055 |
| 10,315,563 B1* | 6/2019 | Harper | .................... | B60Q 5/006 |
| 10,328,769 B2* | 6/2019 | Ferguson | ............... | B65G 67/24 |
| 11,345,277 B2* | 5/2022 | Lujan | .................... | B60Q 1/507 |
| 2009/0174573 A1* | 7/2009 | Smith | .................. | G08G 1/0962 340/905 |
| 2011/0140919 A1* | 6/2011 | Hara | ...................... | B60Q 1/507 340/907 |
| 2013/0061044 A1* | 3/2013 | Pinkus | ..................... | G07C 5/08 713/160 |
| 2015/0268665 A1* | 9/2015 | Ludwick | ................ | B60Q 5/008 701/23 |

(Continued)

FOREIGN PATENT DOCUMENTS

JP          2002175590 A  *  6/2002

*Primary Examiner* — Jonathan M Dager

(57) ABSTRACT

A vehicle information display device according to the present invention comprises a display section provided on at least one side of the front and rear of a vehicle; a sensor section provided on at least one side of the front and rear of the vehicle to measure at least one of the distances and speeds from nearby vehicles or obstacles towards the front or rear of the vehicle; and a control section connected to the display section and the sensor section to control display information displayed on the display section based on measurement information of the sensor section.

8 Claims, 3 Drawing Sheets

(56) References Cited

U.S. PATENT DOCUMENTS

| | | | |
|---|---|---|---|
| 2015/0336502 A1* | 11/2015 | Hillis | G05D 1/0088 |
| | | | 701/23 |
| 2015/0338849 A1* | 11/2015 | Nemec | B60W 50/085 |
| 2016/0179094 A1* | 6/2016 | Sorokin | B60Q 1/549 |
| | | | 701/23 |
| 2016/0231746 A1* | 8/2016 | Hazelton | G05D 1/0274 |
| 2017/0120814 A1* | 5/2017 | Kentley | B60Q 5/008 |
| 2019/0283746 A1* | 9/2019 | Shalev-Shwartz | B60W 50/14 |
| 2020/0079363 A1* | 3/2020 | Frederick | G06V 10/147 |
| 2020/0219397 A1* | 7/2020 | Matthiesen | G08G 1/166 |
| 2020/0292905 A1* | 9/2020 | Larry | G02F 1/1313 |
| 2023/0093599 A1* | 3/2023 | Matthiesen | B60Q 1/268 |
| | | | 701/301 |

\* cited by examiner

INFORMATION DEVICE FOR VEHICLE

CROSS-REFERENCE TO RELATED APPLICATIONS

Any and all priority claims identified in the Application Data Sheet, or any correction thereto, are hereby incorporated by reference under 37 CFR 1.57. This application claims the benefit of S. Korea Provisional Application No. 10-2022-0017893 filed on Feb. 11, 2022, and S. Korea Non-Provisional Application No. 10-2022-0096661 filed on Aug. 3, 2022, respectively. The aforementioned applications are incorporated by reference herein in their entirety, and are hereby expressly made a part of this specification.

FIELD OF THE INVENTION

The present invention relates to a vehicle information display device and more particularly, to a vehicle information display device capable of inducing safe driving and thus preventing an accident from occurring by displaying information previously entered into the vehicle information display device; driving information for the device installed vehicle and driver; and information on vehicles, obstacles, and pedestrians in close proximity to the vehicle wherein the device is installed.

BACKGROUND OF THE INVENTION

In general, a driver must drive while assuring a safe distance from other vehicles to prevent a collision with preceding vehicles. The safety distance is made up of the sum of the free running distance required for the brake device to start operating by operating the brake after the driver recognizes the deceleration or sudden braking of the preceding vehicle, and the braking distance required for the vehicle to stop when the brake is applied.

In addition, since the braking distance becomes longer in proportion to the driving speed of the vehicle, the driver, in consideration of the driving speed of his/her own vehicle, shall use the brake to maintain the safety distance when the distance between the preceding vehicle and his/her own vehicle is shorter than the safety distance, which is the sum of the braking distance and the free running distance at the current driving speed.

However, it is difficult to secure an accurate safety distance with the driver's naked eyes, and in particular, in the case of highways, if the driver is not concentrating on driving, the speed of the vehicle may continuously increase without the drivers being aware of it, thereby reducing the distance between vehicles.

In this case, when the preceding vehicle decelerates or stops, it is difficult or often times late to react to it, which may cause an accident. There have been attempts to maintain a safe distance between vehicles. KR-1019960062810 discloses a distance display apparatus which plans safe distance between vehicles by using laser mode transmission. However, it is limited to this one task of displaying the distance between two vehicles.

Therefore, there is a need for a technology capable of easily identifying the distance between vehicles, or information about any obstacle, pedestrian in close proximity of the vehicle and inducing safe driving in various environments or situations.

SUMMARY OF THE INVENTION

This Summary is provided to introduce a selection of concepts in a simplified form that are further described below in the Detailed Description of the invention. This Summary is not intended to identify key aspects or essential aspects of the claimed subject matter. Moreover, this Summary is not intended for use as an aid in determining the scope of the claimed subject matter.

The present application discloses a vehicle information display device for capable of inducing safe driving and thus preventing an accident from occurring by displaying information on the display device. The information displayed on the display section may include, but not limited to, any information previously entered into the vehicle information display device; driving information for the device-installed vehicle and it's driver; and information on vehicles, obstacles, and pedestrians in close proximity to the vehicle wherein the device is installed.

It is an object of the invention to provide a vehicle information display device comprising a display section on at least one side of the front and rear of a vehicle; a sensor section provided on at least one side of the front and rear of the vehicle to measure at least one of the distances and speeds from nearby vehicles or obstacles approaching the front or rear of the vehicle; and a control section connected to the display section and the sensor section to control display information displayed on the display section based on measurement information of the sensor section.

It is an additional object of the invention to provide a display section comprising a base frame having a predetermined area, a display panel provided on one side of the base frame and comprising a liquid crystal display device or a light emitting display, and a protective panel provided on an outer surface of the display panel to protect the display panel.

It is another object of the invention to provide a display section to selectively display at least one of a video, an image, a control state of the vehicle previously input into the control section, or a number or text corresponding to measurement data measured by the sensor section.

It is a further object of the invention to provide the sensor section comprising a distant sensor for measuring distances from the front or rear of the vehicle to the nearby vehicles or obstacles, and a speed sensor for measuring speeds of the nearby vehicles approaching from the rear of the vehicle.

It is yet another object of this invention to provide the control section comprising a telecommunication unit capable of communicating with an external device, a GPS unit to determine the location of the vehicle, or a recognition camera provided on one side of the front part of the vehicle may be further comprised.

A vehicle having an information display device as another category is a vehicle in which the vehicle information display device according to the above configuration is installed.

The vehicle information display device and the vehicle equipped with the same according to the present invention may have the following effects.

First, the present invention may have an effect of inducing safe driving and thus preventing the occurrence of a traffic accident by displaying the separation distance between the device-installed vehicle and adjacent preceding or following vehicles and the driving speed of one's own vehicle through the display unit.

Second, the present invention may have an effect of inducing safe driving more reliably by displaying not only the separation distance and speed, but also intuitive texts such as, but not limited to, 'stop' or 'slow down' corresponding thereto.

Third, the present invention may have an effect that adjacent vehicles may more clearly check the operating state of the device-installed vehicle by displaying control operations such as brake operation of the device-installed vehicle as well as access information of surrounding vehicles on the display section.

Fourth, the present invention may have an effect that a surrounding situation is recognized through the recognition camera mounted in a vehicle, and such information is displayed on a display unit, so that surrounding vehicles may quickly recognize the surrounding situation and perform safe driving.

Fifth, the present invention may have an effect of obtaining various advertising effects by displaying an advertisement video or image previously input into the control section to be displayed through the display section.

Sixth, the present invention may have an effect of maximizing the visibility of the display section by measuring the illuminance sensor on one side adjacent to the display section and adjusting the brightness of the display section based on this.

The effects of the present invention are not limited to the above-mentioned effects, and other effects not mentioned will be clearly understood by those skilled in the relevant field of technology(art) from the description of the claims.

BRIEF DESCRIPTION OF THE DRAWINGS

The following drawings attached to the specification illustrate embodiments of the present invention and assist in a better understanding of the technical aspects of the present invention in conjunction with the detailed description of the present invention. Thus, the present invention should not be construed as limited only to the matters described in the drawings.

DETAILED DESCRIPTION OF THE INVENTION

Figure 1:
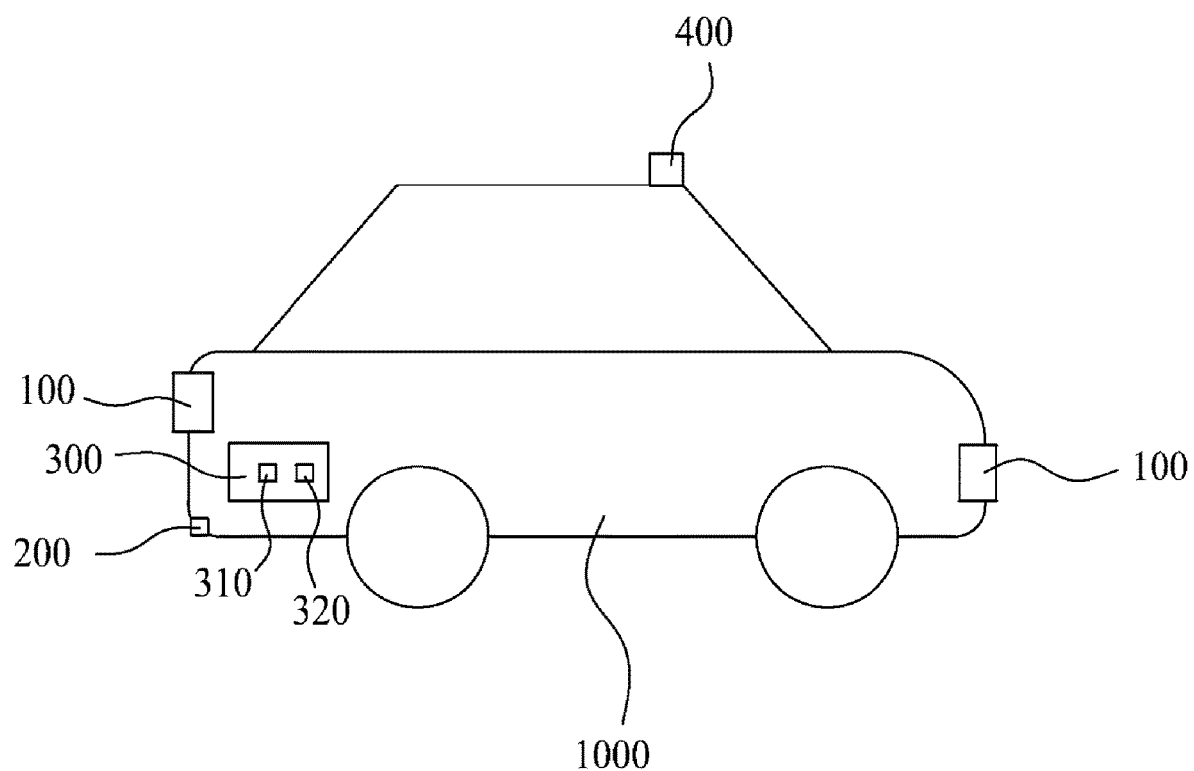
FIG. 1 is a schematic configuration diagram of a vehicle equipped with a vehicle information display device according to the present invention.

The advantages and features of the present invention and methods of achieving them will become clear with reference to the detailed description of the following embodiments taken in conjunction with the accompanying figures. The aspects, embodiments and/or examples described herein are presented for exemplification purposes, and not for limitation purposes. It should be understood that structural and/or logical modifications could be made by someone of ordinary skill in the art without departing from the scope of the invention.

The terms used herein are for describing the embodiments and are not intended to limit the present invention. In this specification, the singular form also includes the plural form unless otherwise specified in the phrase. As used herein, "comprises" and/or "comprising" does not exclude the presence or addition of one or more other elements other than the recited elements. Like reference numerals throughout the specification refer to like elements, and "and/or" includes each and every combination of one or more of the recited elements. Although "first", "second", etc. are used to describe various elements, these elements are not limited by these terms, of course. These terms are only used to distinguish one element from another. Accordingly, the first element mentioned below may also be the second element within the technical idea of the present invention.

Figure 2:
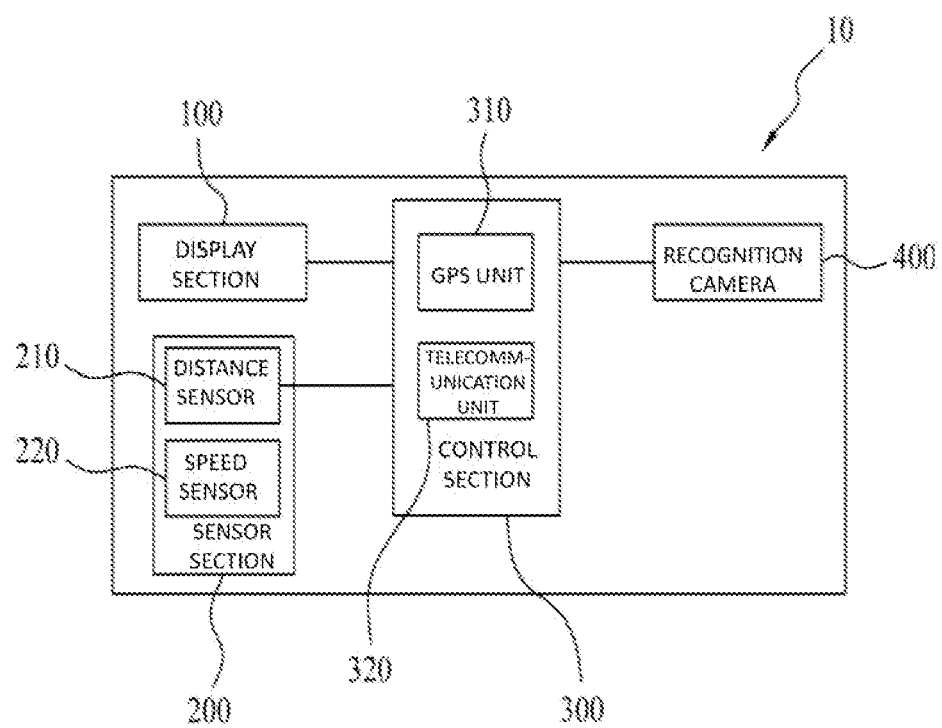
FIG. 2 is a schematic block circuit diagram of a vehicle information display device according to the present invention.

As shown in FIGS. 1 and 2, the vehicle information display device (10) according to the present invention is largely comprises a display section (100), a sensor section (200) and a control section (300).

Figure 3:
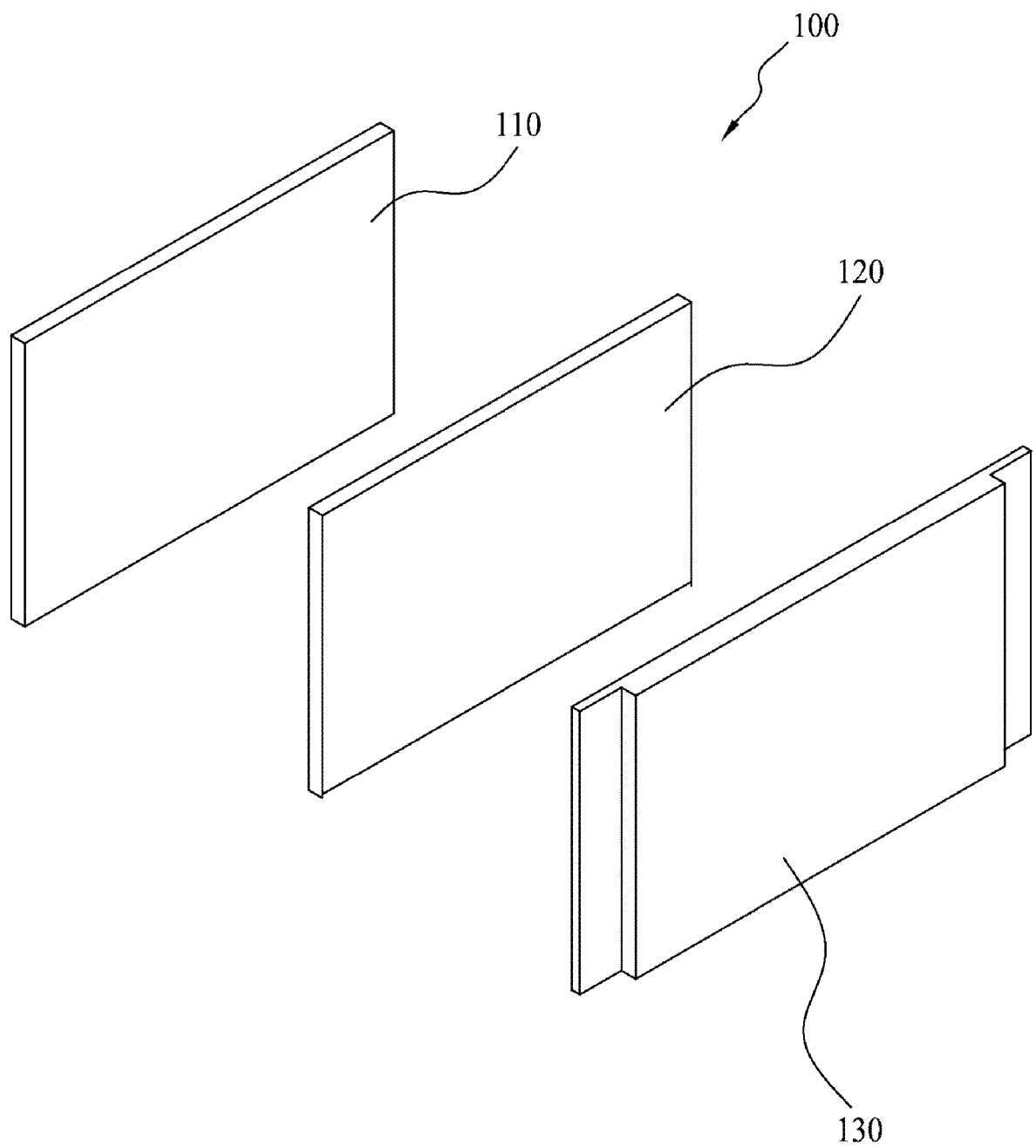
FIG. 3 is an exploded perspective view of a display section according to the present invention.

FIG. 3 is an exploded perspective view of a display section according to the present invention. The display section (100) according to the present invention is a device that displays information related to the vehicle (1000) or the surrounding conditions of the vehicle (1000) under the control signals from the control section (300). The display unit (100) is a device that enables safe driving by displaying the user's vehicle (1000) or surrounding information in the form of videos, images, texts, numbers, etc. to vehicles close to the front or rear of the vehicle (1000), not to the driver of the vehicle (1000). To this end, the display section (100) may be provided on at least one side of the front and rear of the vehicle (1000). Preferably, it may be disposed in various positions depending on the type and shape of the vehicle (1000), but it is better to be disposed in a position where it can be easily captured in the field of views of the preceding or following vehicles. In one embodiment, the display section (100) according to the present invention is preferably disposed on the side or upper surface of the license plate of the vehicle (1000). The display unit (100) as described above may be integrally attached when the vehicle (1000) is manufactured, or may be arbitrarily attached to the vehicle (1000) by a user depending on the useful aspects. Any display device may be used as the display section (100) as long as it can display various information under the control of the control section (300). In one embodiment, the display unit (100) according to the present invention may be composed of a base frame (110), a display panel (120), and a protective panel (130), as shown in FIG. 3.

The base frame (110) serves as a coupling device for attaching the display section (100) to one side of the vehicle (1000) and at the same time provides a space in which the display panel (120) and the protective panel (130) can be seated. The base frame (110) may be formed in various shapes depending on the type of vehicle (1000) to which it is applied, but may preferably be manufactured in various shapes such as a quadrangle, a circle, an oval, or a polygon, or the like having a thin plate-shaped member or a steel frame structure shape surrounding the rim of the display panel (120).

The display panel (120) is a device that substantially displays various information in letters, numbers, images, or videos. The display panel (120) has a shape corresponding to the base frame (110) and is provided to be coupled to the base frame (110). In this case, any display device may be used as the display panel (120) as long as it can smoothly display the information transmitted from the control section (300). However, it is preferable to use a display device capable of automatically adjusting brightness according to ambient illuminance, and it is more preferable to use an electronic panel capable of displaying various information, such as an electroluminescent panel or LCD panel composed of an LED array.

In one embodiment, the display section (100) according to the present invention may be provided in place of the license plate at a position corresponding to the license plate of the vehicle (1000) to selectively display various information and vehicle numbers. In this case, the display panel (120) may comprise the e-ink unit. An E-ink may reduce power consumption or maintain number display, which is the basic function of a license plate, even when power is not supplied.

The e-ink unit generates e-ink. Such an e-ink consumes considerably less power than conventional display devices, and may maintain the last displayed information even when power is cut off, thereby providing continuous information. By using this feature, the unique number of the vehicle (1000) may be displayed on the display panel (120) using e-ink, so that the unique number of the vehicle (1000) can be displayed even when the vehicle (1000) is turned off.

The protection panel (130) is provided on the front part of the display panel (120) to prevent the display panel (120) from being damaged or destroyed by an external impact. It is recommended to use transparent tempered glass, bulletproof glass, or reinforced plastic so that the external impact is prevented from being transmitted to the display panel (120), and the information displayed on the display panel (120) may be smoothly recognized from the outside.

The sensor section (200) is a device provided on at least one side of the front and rear of the vehicle (1000) to be electrically connected to the control section (300), and measuring the conditions such as vehicles, obstacles or surrounding environments close to the front or rear of the device installed vehicle (1000). In one embodiment, the sensor section (200) may comprise various sensor units provided on one side of the front or rear of the vehicle (1000) and capable of measuring the separation distances between the device-installed vehicle (1000) and the preceding or following vehicles, and the speeds or accelerations of the preceding or following vehicles. In one embodiment, the sensor section (200) may comprise a distance sensor (210) that measures the distances to preceding or following vehicles, and a speed sensor (220) or an acceleration sensor that measures the speeds of nearby vehicles approaching from the rear of the vehicle (1000). In the present invention, the sensor section (200) is mainly described as being provided with a distance sensor (210), a speed sensor (220), and an acceleration sensor, but this is only for convenience of explanation, and any sensor unit may be provided as long as it is a sensor capable of measuring various surrounding situations for safe driving.

In addition, the sensor section (200) may further comprise an illuminance sensor provided on one side of the vehicles adjacent to the display section (100) to measure variations in illuminance over time. Since it may not be easy to recognize the display section (100) in other vehicles according to variations in illuminance, such as the incidence angle or the reflection angle of the sun, or entering a tunnel, visibility of the display section (100) may be improved by providing an illuminance sensor and changing the brightness of the display section (100) according to the illuminance measured through the sensor.

The control section (300) is a device that is electrically connected to the display section (100) and the sensor section (200) on one side inside the vehicle (1000) by wire or wirelessly to control display information displayed on the display section (100) and power operation. The control section (300) may use an electric control device provided in the vehicle (1000) to control the vehicle (1000), or may use a separate control device additionally provided in the vehicle (1000) according to the use aspect. If the control section (300) is provided separately from the electric control device of the vehicle (1000), it is recommended that the control section (300) is also electrically connected to the electrical control device of the vehicle (1000) in order to display the brakes, acceleration, and deceleration of the device installed vehicle (1000) on the display section (100).

The control section (300) described above may comprise a GPS unit (310) and a telecommunication unit (320) to collect more accurate and diverse information about the nearest area and display it on the display section (100).

The GPS unit (310) may use a GPS device provided by itself inside the vehicle (1000) or a GPS device for navigation, or may be configured to be additionally provided with a separate GPS unit (310) in the vehicle (1000) or inserted into the control section (300) depending on the use aspects.

In addition, the vehicle information display device (10) according to the present invention may further comprise a recognition camera (400) provided on any one side of the vehicle (1000), preferably on one side of the front part of the vehicle (1000). The recognition camera (400) may be provided to be electrically connected to the control section (300) and transmit captured video and image information to the control section (300). In this way, the control section (300) may provide more information for display on the display section (100) through the video or image information transmitted from the recognition camera (400). For the recognition camera (400), a separate camera device may be installed on any one side of the vehicle (1000), or a black box provided inside the vehicle (1000) may be used as the recognition camera (400). It is obvious that the recognition camera (400) is provided to be electrically connected to transmit/receive information to and from the control section (300) so as to recognize a situation ahead of the vehicle (1000) and display various information on the display section (100).

In the vehicle display device (10) according to the present invention, it is possible to selectively display information for safe driving, such as control information of the device installed vehicle (1000), separation distance between preceding or following vehicles, and speed and acceleration of nearby vehicles, as well as various videos such as surrounding information on the driving and advertisement videos previously input to the control section (300). However, it is preferable that the control section (300) is set to display the safe driving information as the top priority information. That is, when the display of information for safe driving is necessary even while displaying an advertisement video, it is preferable to set to stop the advertisement video and display information for safe driving. This video display process will be described in more detail through various embodiments.

First, the display section (100) installed in the vehicle (1000) measures illuminance level through an illuminance sensor installed adjacent to the display section (100) on the front or rear side of the vehicle (1000) in order to be easily recognized by the preceding or following vehicles, and the control section (300) automatically controls the brightness of the display section (100) so that visibility from adjacent vehicles can be improved. Accordingly, surrounding vehicles or pedestrians may easily check the displayed video of the display section (100) at any time in various environments such as day and night, any weather conditions, and entering a tunnel.

When a nearby vehicle, obstacle, or pedestrian is not recognized in close proximity by the sensor section (200), the control section (300) may display an advertisement video or a message or the like on the display section (100). Regarding such an advertisement video, etc., the control section (300) may automatically display a video previously input into the control section (300) or may selectively display a video selected by the user.

When approaching a vehicle or pedestrian within a certain distance is confirmed through the distance sensor (210) of the sensor section (200) during driving, the control section (300) displays various videos, images, texts, or numbers, etc. for safe driving on the display section (100).

In one embodiment, when a following vehicle approaches from the rear of the device-installed vehicle (1000), the control section (300) may display the separation distance between the following vehicle and the device-installed vehicle (1000), the speed or acceleration of the following vehicle, etc. on the display section (100). More specifically, a warning message may be displayed when the following vehicle approaches the device-installed vehicle (1000) within a predetermined distance which can be configured. For example, when the following vehicle gets closer to the device-installed vehicle (1000) by a safe distance or less, the control section (300), based on the measurement data of the sensor section (200), displays the texts such as, but not limited to, 'Collision warning' or 'Deceleration required', etc., or displays the separation distance between the device installed vehicle (1000) and the following vehicle, the speed of the following vehicle, etc. as numbers on the display section (100), so that the following vehicle may pay more attention to safe driving. Through this, the following vehicle that is in excessive close contact with the device installed vehicle (1000) may check the content displayed on the display section (100) and drive with more focus on safe driving.

In addition, when the control section (300) is connected to a navigation device or a vehicle control device installed in the vehicle (1000), more various information may be provided to nearby vehicles or pedestrians through the display section (100). In one embodiment, when the device-installed vehicle (1000) changes lanes or makes a left or right turn, the display section (100) displays information on the driving direction of the device-installed vehicle (1000) not only on the turn signal but also on the display section (100), so that it can more intuitively and easily convey the driving direction of the device installed vehicle (1000) to nearby vehicles or pedestrians with a narrow driving view. In addition, when the brakes are operated in the device-installed vehicle (1000), whether the brakes are operated is displayed separately from the brake lights, and the deceleration speed of the device-installed vehicle (1000) is displayed so that the following vehicle can prepare accordingly.

In particular, when driving information of the device-installed vehicle (1000) is input into the navigation, the said driving information of the device-installed vehicle (1000) guided by the navigation may be displayed on the display section (100) as texts, symbols, or the like. For example, even if the driver of the device-installed vehicle (1000) fails to operate the turn signal, the contents according to the guidance of the navigation are automatically displayed on the display section (100) so that the following vehicle may recognize it and follow safe driving. In one embodiment, when the device-installed vehicle (1000) is about to enter an expressway ramp a few meters ahead, the navigation system of the vehicle (1000) notifies the driver of this and at the same time, the control section (300) displays a text such as "to turn right after xx feet" on the display section (100) based on this, so that the following vehicle may predict information on the operation of the device installed vehicle (1000) and perform safe operation.

Also, based on information obtained from the navigation or recognition camera (400) of the device-installed vehicle (1000), the control section (300) may quickly deliver the surrounding environment of the device-installed vehicle (1000) to nearby vehicles or pedestrians. In one embodiment, when a navigation system informs that there is a construction site nearby, this is displayed on the display section (100), or whether an accident has occurred ahead, the said information is picked up by the recognition camera (400) and displayed on the display section (100) to induce safer driving.

In addition, through the GPS unit (310) and the telecommunication unit (320) provided in the control section (300), the control section (300) may control various information provided in the surrounding area of the driving vehicle (1000) to be displayed on the display section (100) even if the content is not previously input into the control section (300).

In addition, the information previously input to the control section (300) includes not only video/image information but also various information about the driver of the device-installed vehicle (1000) to induce yielding of surrounding vehicles so that safe driving may be performed. In one embodiment, various information is displayed on the display section (100), such as 'inexperienced driving' when the driver is a beginner, 'disabled driving vehicle' when the driver is disabled, or 'emergency' in emergency situations such as a patient boarding, and through this, it is possible to enable safe driving by inducing yield to surround vehicles or pedestrians.

As described above, the control section (300) may appropriately display on the display section (100) the pre-entered video/image information, information provided from the surroundings based on the GPS unit (310) and the telecommunication unit (320), information on the device installed vehicle (1000) provided by the navigation or automatic control device of the device installed vehicle (1000), and information on the speed, separation distance, etc. of surrounding vehicles approaching the device installed vehicle (1000). Through this, vehicles or pedestrians adjacent to the device-installed vehicle (1000) may acquire various information and obtain an effect of enabling safer driving or walking.

As described above, those skilled in the art to which the present invention pertains will understand that the present invention may be embodied in other specific forms without changing the technical idea or essential features thereof. Therefore, it should be understood that the above-described embodiments are illustrative and not limited in all respects. The scope of the present invention is indicated by the claims to be described later rather than the detailed description, and all changes or modifications derived from the meaning and scope of the claims and equivalent concepts should be construed as being included in the scope of the present invention.

What is claimed is:

1. A vehicle information display device comprising:
   a display section on at least one side of the front and rear of a vehicle, wherein the said display section displays information related to the vehicle thereby preventing accidents or mishaps;
   a sensor section provided on at least one side of the front and rear of the vehicle to measure at least one of the distances and/or speeds from nearby vehicles or obstacles approaching the front or rear of the vehicle; and
   a control section, wherein the said control section collects more accurate and diverse information about the surrounding area, wherein the said control section comprises a recognition camera provided on one side of the front part of the vehicle, wherein the recognition camera captures video and images of nearby surroundings and transmit the said information to the said control section for display on the display section, wherein the said control section is connected to the display section and the sensor section to control the display information displayed on the display section based on measurement information of the sensor section.

2. The information display device of claim 1, wherein the said display section comprises:
   a predetermined base frame having an area, wherein the said base frame attaches the said display section to a vehicle;
   a display panel provided on one side of the said base frame and comprising a liquid crystal display device or a light emitting display; and
   a protective panel provided on the outer surface of the said display panel to protect the display panel, wherein the said display panel and the said protective panel are seated within the said base frame.

3. The information display device of claim 1, wherein the said display section may selectively display at least one of a video, an image, a control state of the vehicle previously input into the said control section, or a number or text corresponding to measurement data measured by the said sensor section.

4. The information display device of claim 1, wherein the said sensor section comprises:
   a distant sensor for measuring distances from the front or rear of the vehicle to the nearby vehicles, pedestrians, or obstacles;
   a speed sensor for measuring speeds of the nearby vehicles approaching from the rear of the vehicle; and
   an illuminance sensor provided on one side of the vehicle adjacent to the said display section, wherein the said illuminance sensor measures variations in illuminance over time.

5. Information display device of claim 1, wherein the said control section comprises a telecommunication unit capable of communicating with an external device.

6. The information display device of claim 1, wherein the said control section further comprise a navigation unit to determine the location of the vehicle.

7. The information display device of claim 1, wherein the said control section may display previously configured information therein in the form of an advertisement video or a message on the display section provided no nearby vehicle, obstacle, or pedestrian is recognized in close proximity by the said sensor section.

8. A vehicle equipped with the vehicle information display device according to claim 1.

* * * * *